Oct. 9, 1945.  W. E. FISHER  2,386,601
DISTILLATION CONTROL
Filed July 3, 1942
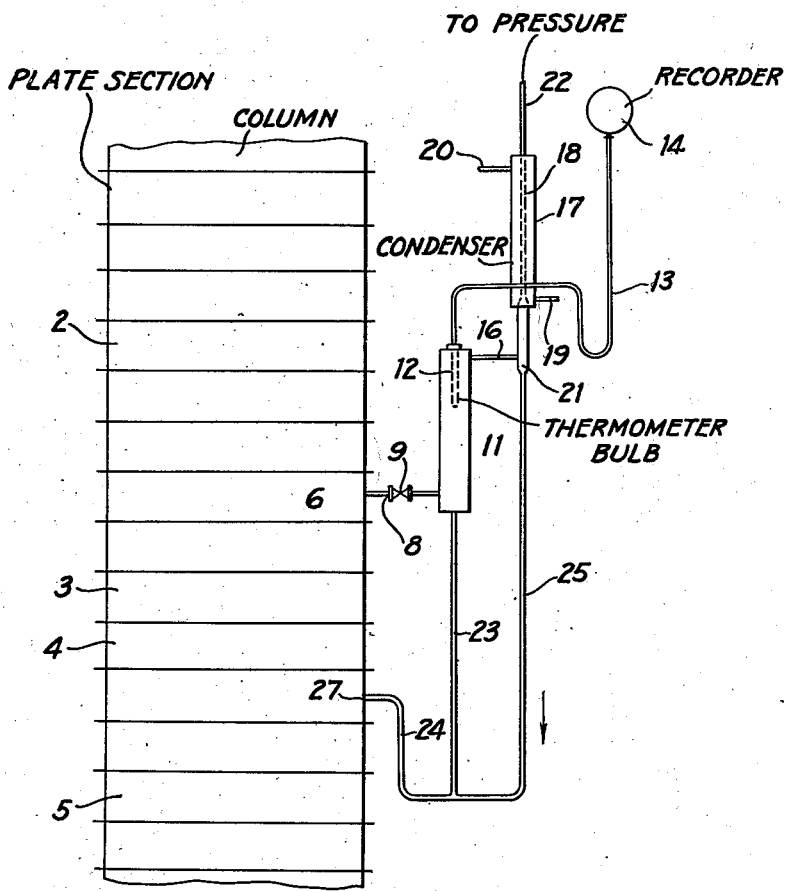
WEBSTER E. FISHER
INVENTOR
BY
ATTORNEYS Patented Oct. 9, 1945

2,386,601

UNITED STATES PATENT OFFICE 2,386,601

DISTILLATION CONTROL

Webster E. Fisher, Pine Bluff, Ark., assignor to Eastman Kodak Company, Rochester, N. Y., a corporation of New Jersey Application July 3, 1942, Serial No. 449,615

5 Claims. (Cl. 202—40)

This invention relates to distillation control and in particular to process and apparatus used in conjunction with distillation for permitting more rapid and more accurate temperature control and measurements.

In distillation and fractionation operation frequently the control thereof is in some manner related to or based upon the measurement of temperatures in various parts of the system. That is, whether this control be manual or automatic, the changes in the distillation are made dependent upon the temperature conditions prevailing. The pressure inside the fractionating column is usually above atmospheric pressure due to the static and velocity heads which are impressed on the vapors passing through the distillation unit. The exact amount of this pressure will depend upon the particular apparatus and other factors surrounding the distillation process, but frequently may amount to 6 or 8 pounds per square inch pressure or even higher.

It is therefore apparent from the known principle of physical chemistry to the effect that the boiling points of liquids vary appreciably with the pressure under which the boiling points are measured, that the boiling points and other temperatures recorded or measured by temperature measuring devices utilized in conjunction with such distillation processes do not necessarily indicate exact value.

For example, considering a substance such as acetone, the boiling point thereof will be raised approximately 4° F. by one pound pressure increase. Hence, assuming that such a liquid was undergoing distillation with thermometers located in the intermediate or lower part of a distillation column, the indicated temperature would not be entirely accurate nor dependable. That is, the indicated temperature would be the boiling point of the mixture under the pressure obtained in the column and, hence, will vary, depending not only on the composition of the mixture but also upon the inside pressure of the column, which pressure is influenced by various factors such as the rate at which the column is operating, the composition of the mixture being fed, the back pressure exerted by the liquid levels of the plates within the column, and the like factors, all of which, as indicated above, tend to cause the operating conditions within the column to be under pressure which may amount to several pounds per square inch.

It is therefore apparent that for particularly accurate work and for carrying out distillation in the most efficient manner that rather than depend upon measurements under such circumstances as the above which may represent only an approximation or even inaccurate information if the pressure is material, the development of procedure and apparatus whereby relatively accurate temperature results may be obtained is a highly desirable result.

This invention has for one object to provide a process which permits the measurement of boiling points of materials within apparatus of the class described, not only at the actual temperature conditions prevailing outside of the column, but if desired at some standard pressure. Still another object is to provide a novel procedure whereby accurate temperature measurements in connection with distillation may be simply and efficiently carried out. Still another object is to provide procedure whereby a plurality of temperature measurements or other measurements influenced by pressure may be made under the same conditions, thereby lending themselves to more ready comparison.

A still further object is to provide novel apparatus for use in conjunction or association with standard distilling units for carrying out the aforesaid procedure or better and more accurate measurement of temperatures and other measurements influence by pressure. Other objects will appear hereinafter.

After considerable investigation I have found a procedure and apparatus whereby true measurements may be obtained simply and rapidly in distillation processes. This is advantageous in that being relatively accurate the operator is able to determine more exactly the conditions prevailing in the distillation and, consequently, in many instances obtain better separation of the material being distilled, or other desired results.

For a better understanding of my invention reference is made to the attached drawing which is a semi-diagrammatic side elevation view of one form of apparatus embodying my invention. In the figure certain parts have only been partially shown and other parts merely diagrammatically indicated for simplicity and clarity of consideration.

In referring to the drawing 2 represents a portion of a distilling column of any conventional construction, exemplified by a bubble plate column made up of a number of sections 3, 4, and 5. Such a column merely represents a type of embodiment to which my invention would usually by applied. However, my invention is not to be entirely restricted in this respect inasmuch as it may be applied to large conduits carrying mixtures of vapors and liquids and otherwise utilized in conjunction with systems which in fact are subjected to varying pressures but with respect to which it is desired to make accurate measurements of conditions as they would exist if such pressures were not involved.

On one of the plate sections, as for example at 6 where it is desired to measure the temperature, there would be provided a conduit 8 leading through a valve 9 to an enclosed chamber 11, the construction and function of which will be discussed in detail hereinafter. It is pointed out that the choice of section 6 is not a limitation upon my invention except that a section would be chosen where it was desired that a measurement be made. However, this might be in any section of the column intermediate or near the upper part or the lower part, as the case might be. Also if it were desired to make measurements at more than one section this may be accomplished by repetition of the apparatus and connections, in which event in some instances, it may be desirable to connect the apparatus into a common or standard pressure supply so that the results will be obtained under one standard. However, for the purposes of describing present apparatus arrangement it is sufficient to indicate the connection to the single section 6.

Referring to part 11 this would generally comprise an elongated chamber in which there is positioned in the upper end thereof a temperature recording element 12. Usually this would comprise a thermometer bulb which may be of any type of indicating, recording, or controlling instrument. This bulb is connected by conduit 13 to a recording or indicating mechanism 14. The latter, for example, in the instance of automatic controllers could comprise the conventional type of revolving temperature recorder or analogous device.

Also connected to chamber 11 through conduit 16 is a condenser 17. The condenser may, in the event of handling ordinary boiling components, merely comprise a jacket enclosing the inner conduit 18. A suitable cooling liquid inlet would be provided at 19 and an outlet at 20. Preferably at or about the point in conduit 18 where conduit 16 joins the same there would be an enlarged section as at 21. The upper portion of conduit 18, after leaving the condenser, namely at 22, may be vented to the atmosphere or be attached to a constant pressure source.

Referring to the lower part of chamber 11 there is attached thereto conduit 23 which leads into conduit 24, namely, the conduit which leads back to column 2 and, also, has attached thereto conduit 25, the return conduit from condenser 17. In my preferred construction conduit 24 would be attached to a section of the column substantially lower than section 6, as for example at point 27.

The operation of my novel apparatus arrangement it is believed will be apparent from the following description. My apparatus is particularly useful in connection with distilling operations applied to various solvent mixtures such as mixtures of alcohols and ketones or the apparatus might be employed in conjunction with distillation processes for azeotropically dehydrating lower aliphatic acids, exemplified by the dehydration of aqueous acetic acid solutions by means of an ester entrainer. However, the process and apparatus may be applied in the treatment of various other mixtures.

Assuming therefore that the column 2 is filled with vapors and liquids of the mixture undergoing distillation, in operation vapor from the interior of column 2, as at plate 6, is passed through conduit 8 and valve 9 into the chamber 11. The valve 9 may be opened to an extent to permit the desired amount of the vapor to continuously pass into chamber 11.

It has already been pointed out that the column 2 is under some internal, possibly variable pressure, as for example several pounds per square inch, in accordance with conditions usually encountered in the industry in practice. Hence, the temperature prevailing in the interior of the column, as for example at plate 6, or any other plate, is that corresponding to the boiling point of the mixture at the pressure prevailing in the column. Atmospheric pressure or standard conditions are the conditions under which the boiling points of components usually are listed in handbooks.

The amount of vapors permitted to enter chamber 11, or conversely, the size of chamber 11, should be such that there is sufficient surface present in order that these vapors, which in general will be superheated, upon entering chamber 11 will have an opportunity to cool to the saturation temperature. This temperature is, of course, the boiling point of these vapors at the particular pressure prevailing inside chamber 11. The particular pressure prevailing inside chamber 11, however, can be definitely controlled because, as will be explained in detail, it will depend upon whether conduit 22 is merely vented to the atmosphere or is attached to a known pressure such as, for example, exactly 760 mm. pressure (standard conditions). In the instance where the apparatus is vented to the atmosphere, the known pressure is, of course, the atmospheric pressure then prevailing at that particular time. While there is, of course, some variation in atmospheric pressure, it is sufficiently constant where extremely accurate measurements are not required. However, in the latter instance, where a definite and controlled pressure is applied to 22 there is, of course, no such variation.

The temperatures of the vapors entering chamber 11 may be as much as 10° F. to 20° F. above their normal boiling point. The amount of cooling (surface) necessary to reduce the temperature to the boiling point will of course vary, depending upon the amount of vapors admitted to the chamber and the surrounding temperature. If desired, the normal cooling capacity of chamber 11 may be supplemented by inserting a cooling coil or other means within the chamber. The chamber 11 may be jacketed in a manner comparable to condenser 17 in the event sufficient normal temperature reduction is not obtained. On the other hand, it is pointed out that there should not be too much cooling in chamber 11 because should there be so much that a substantial amount of the vapors were condensed into liquid, such partial condensation would amount to changing the composition of the vapors and, consequently, its boiling point. Hence, under such conditions where there has been material disturbance of the composition of the vapor, there would not be a true temperature measurement of a vapor composition comparable to the vapor composition within the column. However, by controlling the amount of the vapors admitted into chamber 11 as by valve 9 and the size and cooling, if cooling coils or the like are used in chamber 11, the aforesaid reduction in temperature may be brought about without difficulty.

In many cases where the present apparatus and procedure would be applied it would be where the materials undergoing fractionation in the column are difficultly separable; therefore, partial condensation would have only a slight tendency to replete one of the components in particular, since a mixture of the components would be partially condensed. Hence, in the treatment of such difficultly separable mixtures partial condensation would not change the boiling point more than a small fraction of a degree.

Referring back to the saturated vapors in chamber 11, these vapors coming in contact with the thermometer bulb 12 permit the recording of accurate temperatures. The vapors then pass from chamber 11 through conduit 16 to the conduit 21 from which they pass by way of conduit 18 through condenser 17 where they are totally condensed and the condensate flows through conduit 25 back to the column at point 27. In some instances, in the event of difficultly condensable vapors, condenser 17 could comprise a refrigerated or brine condenser.

As already indicated, conduit 18 is either vented to the atmosphere or attached to a controlled pressure source, hence, due to the interconnection of conduits it follows that chamber 11 is under a predetermined pressure. Therefore, the vapors within chamber 11 being under predetermined pressure may be subjected to temperature measurement or other measurement, as have been described, wherein variation in pressure would alter the result.

Any condensate collecting in chamber 11 flows through conduit 23 through conduit 24 back into the column as at 27.

As already indicated, the foregoing procedure and apparatus is particularly useful in conjunction with fractionating units operating on difficultly separable mixtures, as for example mixtures of methanol, acetone, and water, acetic acid and water, acetic acid and propionic acid, propionic acid and butyric acid, ethylene chloride and propylene chloride, and methyl alcohol and ethyl alcohol, and the various other mixtures.

For example, considering the instance that column 2 was operating on a mixture of alcohols and ketone, a fraction of this mixture from plate 6 would be drawn into chamber 11 in which chamber the mixture would be subjected either to atmospheric pressure or other relatively constant pressure applied as already described. From the temperature recorded at the known pressure there would be obtained an accurate temperature value from which it would be possible to determine various data such as the relative proportions of the alcohol and ketone in the mixture and other data determinable from accurate boiling point information.

The condensed alcohols and ketones would flow through conduits 23 and 25 back to the column at point 27.

From the foregoing disclosure, it will be apparent certain changes may be made in the apparatus and procedure within the scope of my invention. For example, while I have found it convenient to illustrate the invention by reference to a device in which the condensate from the measuring chamber is led back into the column, this is only a matter of operational convenience and is not a vital part of the apparatus or process. Alternatively, the condensate could be returned to a storage tank or even discarded. While the above-described procedure for accurately determining conditions inside the column has been described by reference to the case in which the measuring pressure, that is, the pressure in chamber 11, is lower than that in column 2, a compressor could be installed in conduit 8 and pressure applied so as to measure temperatures at a pressure above that in the column. In this case, cooling would not be required, and heating of the withdrawn vapors might actually be necessary.

It is, therefore, apparent that my invention is susceptible of some modification.

What I claim and desire to be secured by Letters Patent of the United States is:

1. In a process for the distillation of the difficultly separable components in a distillation unit operating under internal pressure, which pressure may be variable, wherein it is desired to obtain accurate measurements which otherwise would be effected by said internal pressure, the steps which comprise withdrawing vapors from within the distillation unit at a point where it is desired to obtain measurements, cooling the withdrawn vapors to saturation, said cooling, however, being insufficient to cause any substantial partial condensation of the vapors, also said cooling being carried out under a determinable pressure, taking the temperature of the vapors, withdrawing the vapors after said temperature has been obtained, cooling the vapors to obtain condensate and returning the condensate to the distillation.

2. In a process of distillation in a distillation column operating under internal pressure which may be variable and wherein it is desired to obtain a plurality of temperature measurements of an improved accuracy, which measurements would be effected by some internal pressure if obtained directly upon said distillation, the improvement procedure which comprises withdrawing vapors from the distillation at a plurality of points where it is desired to measure the temperature, separably cooling the withdrawn vapors to saturation, however, said cooling being insufficient to cause any substantial partial condensation of the vapors, subjecting these vapors to a determined common pressure, obtaining the temperature measurement under this common pressure condition, withdrawing and further cooling the vapors to obtain condensate and returning the condensate to distillation.

3. Apparatus for aiding in the control of distillation processes in a distillation column having a plurality of vertically spaced plates comprising a conduit for the withdrawal of vapors in open communication with the vapor space above one plate of the column and a conduit for the return of condensed vapors connected to the space above a lower plate of the column, an elongated closed chamber connected to side conduits, a temperature sensitive element positioned within the chamber communicatively connected to an externally observable indicator, a conduit leading from said chamber to a source of predetermined pressure, said last named conduit including an enlarged section, means for cooling the conduit between said enlarged section and the source of pressure, and a conduit connecting the enlarged conduit section with the condensed vapor return conduit.

4. A process in accordance with claim 3 wherein the withdrawal of the vapors, cooling thereof, condensing thereof, and return are substantially continuous.

5. In the process of distillation, where it is desired to measure the boiling point of the material undergoing distillation at a pressure lower than that obtaining inside the equipment, the steps which comprise withdrawing vapors from a point within the equipment, cooling the vapors to saturation point, said cooling, being insufficient to cause any appreciable partial condensation of the vapors, said cooling being carried out under a predetermined pressure, and measuring the desired temperature of the vapors.

WEBSTER E. FISHER.